(12) United States Patent
Risan et al.

(10) Patent No.: US 8,160,963 B2
(45) Date of Patent: *Apr. 17, 2012

(54) METHOD AND SYSTEM FOR PROVIDING LOCATION-OBSCURED MEDIA DELIVERY

(75) Inventors: Hank Risan, Santa Cruz, CA (US); Edward Vincent Fitzgerald, Santa Cruz, CA (US)

(73) Assignee: Music Public Broadcasting, Inc., Santa Cruz, CA (US)

( * ) Notice: Subject to any disclaimer, the term of this patent is extended or adjusted under 35 U.S.C. 154(b) by 90 days.

This patent is subject to a terminal disclaimer.

(21) Appl. No.: 12/833,671

(22) Filed: Jul. 9, 2010

(65) Prior Publication Data

US 2010/0275272 A1 Oct. 28, 2010

Related U.S. Application Data

(63) Continuation of application No. 10/218,241, filed on Aug. 13, 2002.

(60) Provisional application No. 60/323,468, filed on Sep. 18, 2001, provisional application No. 60/379,979, filed on May 10, 2002.

(51) Int. Cl.
*G06F 21/00* (2006.01)

(52) U.S. Cl. .............. 705/57; 705/904; 705/51; 726/5; 713/176

(58) Field of Classification Search .............. 705/57
See application file for complete search history.

(56) References Cited

U.S. PATENT DOCUMENTS

| | | | | |
|---|---|---|---|---|
| 6,021,438 A * | 2/2000 | Duvvoori et al. | ............. | 709/224 |
| 6,718,328 B1 * | 4/2004 | Norris | ............. | 709/229 |
| 6,917,923 B1 * | 7/2005 | Dimenstein | ............. | 705/51 |
| 6,947,557 B1 * | 9/2005 | Megiddo et al. | ............. | 380/30 |
| 6,952,836 B1 * | 10/2005 | Donlan et al. | ............. | 725/116 |
| 7,047,241 B1 * | 5/2006 | Erickson | ............. | 1/1 |
| 7,058,597 B1 * | 6/2006 | Ronning et al. | ............. | 705/26.35 |
| 7,203,838 B1 * | 4/2007 | Glazer et al. | ............. | 713/176 |
| 2001/0027491 A1 * | 10/2001 | Terretta et al. | ............. | 709/238 |
| 2002/0002468 A1 * | 1/2002 | Spagna et al. | ............. | 705/1 |
| 2003/0028765 A1 * | 2/2003 | Cromer et al. | ............. | 713/164 |
| 2003/0221127 A1 * | 11/2003 | Risan et al. | ............. | 713/201 |
| 2005/0060542 A1 * | 3/2005 | Risan et al. | ............. | 713/165 |
| 2005/0192815 A1 | 9/2005 | Clyde | | |

OTHER PUBLICATIONS

Music Public Broadcasting, "Response to Request for Information. [online]", http://net.educause.edu/elemtents/attachments/rfi/rfi__2/Music__Public__Broadcasting__original.pdf, (Aug. 20, 2003),10.

"Music Public Broadcasting", *MPB Response to JCHEEC Technology Task Force RFI #2*, (Aug. 20, 2003),10 pages.

* cited by examiner

*Primary Examiner* — Jamie Kucab

(57) ABSTRACT

One embodiment of the present invention enables delivery of "on-demand" high fidelity media content to computers via the Internet while restricting unauthorized users from directly retrieving media content from its source database. Once the computer receives the media, it is stored using hidden directories so that it may not be easily shared with others. Within the present embodiment, there are different functionality that are implemented in order to protect and monitor the media content source. For example, the actual address location of the media database is hidden from content recipients while its address directory is periodically change making past addresses obsolete. Additionally, an access key procedure and rate control restrictor may also be implemented to monitor and restrict suspicious media content requests. By implementing these and other functionality, the present embodiment restricts redistribution of delivered media content and provides a means for compensating owners of copyrighted media content.

18 Claims, 5 Drawing Sheets

METHOD AND SYSTEM FOR PROVIDING LOCATION-OBSCURED MEDIA DELIVERY

CROSS REFERENCE TO RELATED APPLICATIONS

The present patent application is a continuation of U.S. patent application Ser. No. 10/218,241, filed Aug. 13, 2002, entitled "Method and System for Providing Location-Obscured Media Deliver," by Hank Risan et al., assigned to the assignee of the present application and incorporated in its entirety herein; which claimed priority to U.S. Provisional Patent Application No. 60/323,468 entitled "User Selectable and Location-Obscured Streaming Media Method and System" by Hank Risan et al., filed Sep. 18, 2001, and U.S. Provisional Patent Application No. 60/379,979 entitled "Method and System for Providing User Selectable and Location-Obscured Streaming Media" by Hank Risan et al., filed May 10, 2002, which are both hereby incorporated by reference.

TECHNICAL FIELD

The present invention generally relates to the field of media. More particularly, the present invention relates to the field of media delivery.

BACKGROUND

Computers have become integral tools used in a wide variety of different applications, such as in finance and commercial transactions, computer-aided design and manufacturing, health care, telecommunication, education, etc. Computers are finding new applications as a result of advances in hardware technology and rapid development in software technology. Furthermore, the functionality of a computer system is dramatically enhanced by coupling these type of stand-alone devices together in order to form a networking environment. Within a networking environment, users may readily exchange files, share information stored on a common database, pool resources, and communicate via electronic mail (e-mail) and video teleconferencing. Furthermore, computers which are coupled to a networking environment like the Internet provide their users access to data and information from all over the world. Computer systems have become useful in many aspects of everyday life including providing entertainment to their users.

For example, a computer system may be coupled to the Internet and receive music from a wide variety of web site sources. There are different ways that a computer system may receive music via the Internet. One common way is for the computer to receive streaming music from a web site wherein the computer user typically does not choose the songs that he or she listens to but instead receives broadcast music. However, it should be appreciated that there are disadvantages associated with this streaming media technique for receiving music.

One of the disadvantages is that the computer user is unable to choose specific songs to listen to and have them delivered to his or her computer "on-demand." Another disadvantage with the streaming music delivery technique is that as more and more computers receive the simultaneously broadcast music, the more and more congested the communication networks of the Internet become. In order to lessen the severity of this type of network congestion, media streamers usually decrease the data rate of the streaming audio in order to be able to handle more clients. However, by decreasing the data rate of the music its fidelity is also degraded.

Some streaming music delivery systems require a participating computer system to acquire a proprietary audio player in order to receive and play music which has been encrypted so that the music is not distributed to others in an uncontrolled fashion. Nevertheless, there are disadvantages associated with this technique also. For example, one of the disadvantages is that the fidelity of the received music can be degraded as a consequence of its encryption and decryption. Additionally, an encryption process typically involves more data being included with the streaming music which may provide additional congestion to communication networks of the Internet. Another disadvantage associated with some proprietary audio players is that they are not compatible with certain computer operating system platforms which consequently restricts the number of computer systems that may utilize them.

Another technique for acquiring music with a computer is by accessing a music file sharing web site via the Internet. Currently there are a variety of different Internet music file sharing web sites accessible to computers. Typically, these file sharing web sites enable computer users to share music files in a point-to-point manner thereby enabling them to receive music which may then be stored by their computer for use or further distribution. It should be appreciated that there are disadvantages associated with this type of music file sharing technique.

One of the disadvantages is that the music file sharing computer users usually do not compensate the owner (e.g., record company, artist, etc.) of copyrighted music after receiving a copy of it. One of the reasons for this situation is that music file sharing web sites commonly do not control or even monitor the music being exchanged among different computers. And even when these web sites try to record and/or control the distribution of music, it may be thwarted by simply changing the file name of the song thereby enabling it to continue to be distributed freely.

Another disadvantage associated with the music file sharing technique previously described is that the music received may be a low fidelity product. There are different causes for this low fidelity. For example, there is usually no established quality level that has to be met in order to share music files via the Internet. As such, the original "source" of a shared music file is typically music copied from a compact disc (CD) to a computer which may be done in a substandard manner because an operator is not concerned with quality and/or does not even have the tools necessary to produce a high fidelity product. A further disadvantage associated with this music file sharing technique is that as more and more file sharing or swapping occurs, communication network systems of the Internet can get increasingly more congested thereby reducing the efficiency of data transfer between different computers.

SUMMARY OF THE INVENTION

Accordingly, a need exists for a method and system for delivering "on-demand" high fidelity music to computer systems via the Internet which does not involve proprietary audio players and/or encryption of the music. A further need exists for a method and system which meets the above need and does not overly congest the communication networks of the Internet. Another need exists for a method and system which meets the above needs and monitors the music delivered in order to compensate the owner of copyrighted music for it. The present invention provides one or more embodiments which accomplish the above mentioned needs.

Specifically, one embodiment of the present invention enables delivery of "on-demand" high fidelity media content to computers via the Internet while restricting unauthorized users from directly retrieving media content from its source database. Once the computer receives the media, it is stored using hidden directories so that it may not be easily shared with others. Within the present embodiment, there are different functionality that are implemented in order to protect and monitor the media content source. For example, the actual address location of the media database is hidden from content recipients while its address directory is periodically change making past addresses obsolete. Additionally, an access key procedure and rate control restrictor may also be implemented to monitor and restrict suspicious media content requests. By implementing these and other functionality, the present embodiment restricts redistribution of delivered media content and provides a means for compensating owners of copyrighted media content.

In another embodiment, the present invention provides a method for providing media content from a source database to a computer while preventing unauthorized access to the source database. The method includes transmitting via a communication network a first request for a media content list from the computer. Additionally, the method includes transmitting to the computer via the communication network the media content play list together with a unique identification, in response to receiving the first request. The method also includes transmitting a second request for delivery of a media content together with the unique identification, in response to receiving the media content list. Furthermore, the method includes transmitting to the computer via the communication network an access key together with an address for the source database containing the media content, in response to the unique identification of the second request being valid. Moreover, the method includes transmitting a third request together with the access key, in response to receiving the access key together with the address of the source database. The method also includes transmitting the media content to the computer, in response to the access key being valid.

In yet another embodiment, the present invention provides a system for providing a media content stored by a content server to a computer while preventing unauthorized access to the media content stored by the content server. The system includes means for transferring via a communication network a first request for a media content list from the computer. Furthermore, the system includes means for transferring to the computer via the communication network the media content list together with a unique identification, in response to receiving the first request. Additionally, the system includes means for transferring a second request for delivery of a media content of the media content list together with the unique identification, in response to receiving the media content list. The system also includes means for transferring to the computer via the communication network a time sensitive access key together with an address of the content server containing the media content, in response to the unique identification of the second request being valid. Moreover, the system includes means for transferring a third request together with the time sensitive access key to the content server, in response to receiving the time sensitive access key together with the address of the content server. The system also includes means for transferring the media content to the computer, in response to the time sensitive access key being valid.

In still another embodiment, the present invention provides a computer readable medium having computer readable code embodied therein for causing a system to perform: transmitting via a communication network a first request for a media content list from a computer; transmitting to the computer via the communication network the media content list together with a unique identification, in response to receiving the first request; transmitting a second request for delivery of a media content of the media content list together with the unique identification, in response to receiving the media content list; transmitting to the computer via the communication network an access key together with an address for the media content, in response to the unique identification of the second request being valid; transmitting a third request together with the access key, in response to receiving the access key together with the address of the media content; transmitting the media content to the computer, in response to the access key being valid.

The present invention provides these advantages and others which will no doubt become obvious to those of ordinary skill in the art after having read the following detailed description of embodiments in accordance with the present invention.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE INVENTION

Figure 1:
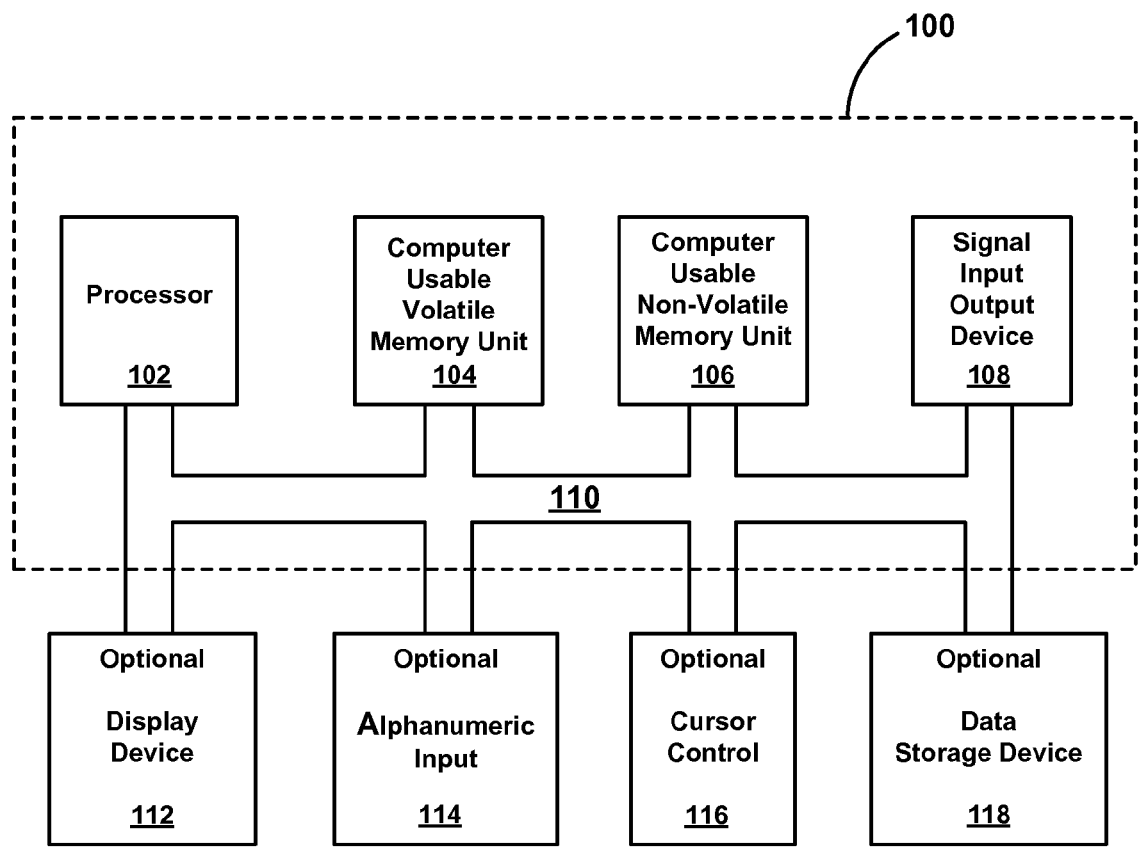
FIG. 1 is a block diagram of an embodiment of an exemplary computer system that may be used in accordance with the present invention.

Reference will now be made in detail to embodiments of the invention, examples of which are illustrated in the accompanying drawings. While the invention will be described in conjunction with embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Notation and Nomenclature

Some portions of the detailed descriptions which follow are presented in terms of procedures, logic blocks, processing, and other symbolic representations of operations on data bits within a computing system or digital system memory. These descriptions and representations are the means used by those skilled in the data processing arts to most effectively convey the substance of their work to others skilled in the art. A procedure, logic block, process, etc., is herein, and generally, conceived to be a self-consistent sequence of steps or instructions leading to a desired result. The steps are those requiring physical manipulations of physical quantities. Usually, though not necessarily, these physical manipulations take the form of electrical or magnetic signals capable of being stored, transferred, combined, compared, and otherwise manipulated in a computing system or similar electronic computing device. For reasons of convenience, and with reference to common usage, these signals are referred to as bits, values, elements, symbols, characters, terms, numbers, or the like with reference to the present invention.

It should be borne in mind, however, that all of these terms are to be interpreted as referencing physical manipulations and quantities and are merely convenient labels and are to be interpreted further in view of terms commonly used in the art. Unless specifically stated otherwise as apparent from the following discussions, it is understood that throughout discussions of the present invention, discussions utilizing terms such as "providing" or "determining" or "activating" or "controlling" or "transmitting" or "receiving" or "recognizing" or "generating" or "utilizing" or "storing" or the like, refer to the action and processes of a computing system, or similar electronic computing device, that manipulates and transforms data. The data is represented as physical (electronic) quantities within the computing system's registers and memories and is transformed into other data similarly represented as physical quantities within the computing system memories or registers or other such information storage, transmission, or display devices.

Exemplary Hardware in Accordance with the Present Invention

FIG. 1 is a block diagram of an embodiment of an exemplary computer system 100 that may be used in accordance with the present invention. It is understood that system 100 is not strictly limited to be a computer system. As such, system 100 of the present embodiment is well suited to be any type of computing device (e.g., server computer, desktop computer, laptop computer, portable computing device, etc.). Within the discussions of the present invention, certain processes and steps are discussed that are realized, in one embodiment, as a series of instructions (e.g., software program) that reside within computer readable memory units of computer system 100 and executed by a processor(s) of system 100. When executed, the instructions cause computer 100 to perform specific actions and exhibit specific behavior which is described in detail herein.

Computer system 100 of FIG. 1 comprises an address/data bus 110 for communicating information, one or more central processors 102 coupled with bus 110 for processing information and instructions. Central processor unit(s) 102 may be a microprocessor or any other type of processor. The computer 100 also includes data storage features such as a computer usable volatile memory unit 104, e.g., random access memory (RAM), static RAM, dynamic RAM, etc., coupled with bus 110 for storing information and instructions for central processor(s) 102, a computer usable non-volatile memory unit 106, e.g., read only memory (ROM), programmable ROM, flash memory, erasable programmable read only memory (EPROM), electrically erasable programmable read only memory (EEPROM), etc., coupled with bus 110 for storing static information and instructions for processor(s) 102.

System 100 also includes one or more signal generating and receiving devices 108 coupled with bus 110 for enabling system 100 to interface with other electronic devices. The communication interface(s) 108 of the present embodiment may include wired and/or wireless communication technology. For example, in one embodiment of the present invention, the communication interface 108 is a serial communication port, but could also alternatively be any of a number of well known communication standards and protocols, e.g., a Universal Serial Bus (USB), an Ethernet adapter, a FireWire (IEEE 1394) interface, a parallel port, a small computer system interface (SCSI) bus interface, an infrared (IR) communication port, a Bluetooth wireless communication adapter, a broadband connection, and the like. In another embodiment a digital subscriber line (DSL) connection may be employed. In such a case the communication interface(s) 108 may include a DSL modem. In any case, the communication interface(s) 108 may provide a communication interface to the Internet.

Optionally, computer system 100 can include an alphanumeric input device 114 including alphanumeric and function keys coupled to the bus 110 for communicating information and command selections to the central processor(s) 102. The computer 100 can also include an optional cursor control or cursor directing device 116 coupled to the bus 110 for communicating user input information and command selections to the central processor(s) 102. The cursor directing device 116 can be implemented using a number of well known devices such as a mouse, a track ball, a track pad, an optical tracking device, a touch screen, etc. Alternatively, it is appreciated that a cursor can be directed and/or activated via input from the alphanumeric input device 114 using special keys and key sequence commands. The present embodiment is also well suited to directing a cursor by other means such as, for example, voice commands.

The system 100 of FIG. 1 can also include a computer usable mass data storage device 118 such as a magnetic or optical disk and disk drive (e.g., hard drive or floppy diskette) coupled with bus 110 for storing information and instructions. An optional display device 112 is coupled to bus 110 of system 100 for displaying video and/or graphics. It should be appreciated that optional display device 112 may be a cathode ray tube (CRT), flat panel liquid crystal display (LCD), field emission display (FED), plasma display or any other display device suitable for displaying video and/or graphic images and alphanumeric characters recognizable to a user.

Exemplary Network in Accordance with the Present Invention

Figure 2:
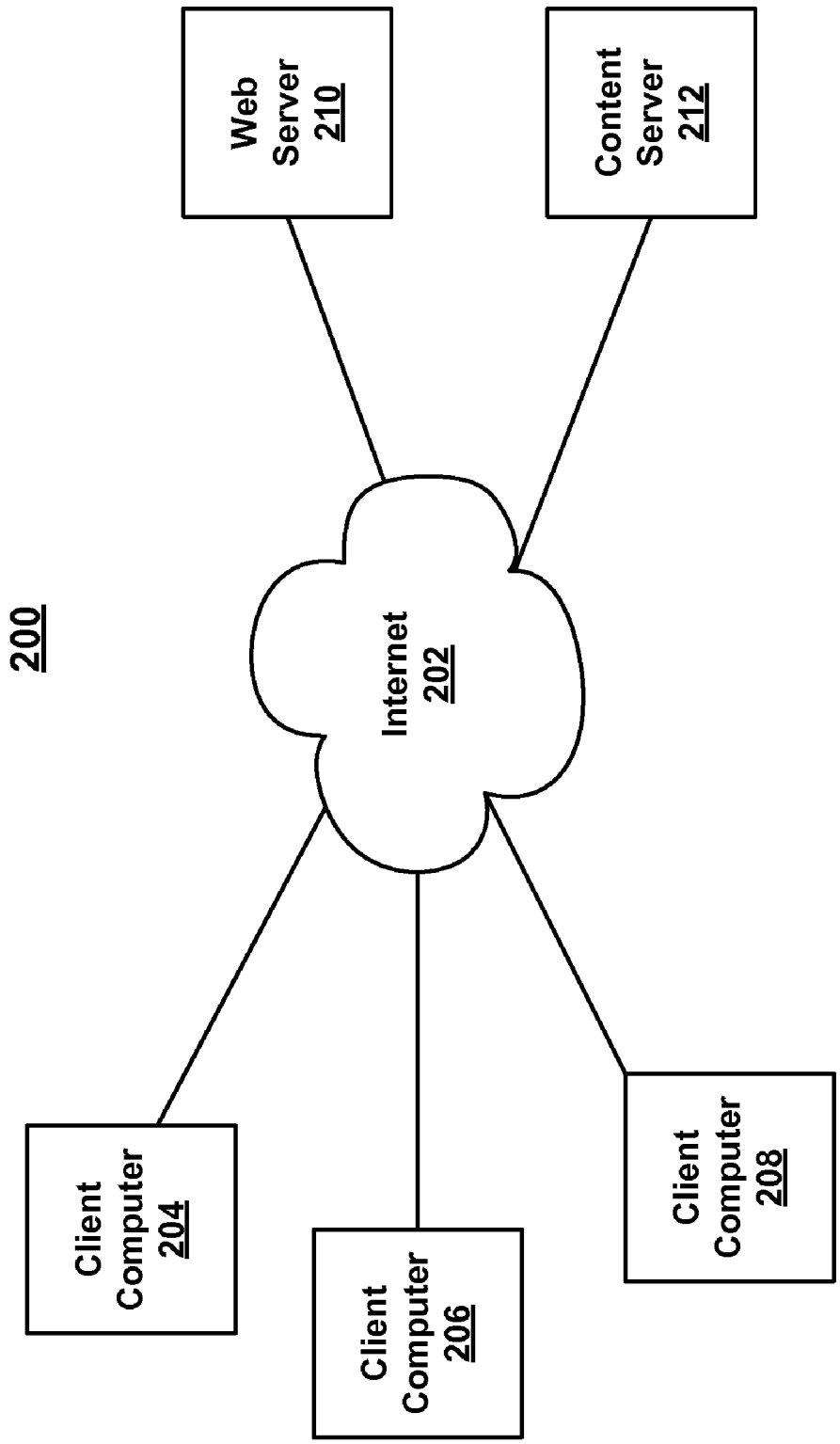
FIG. 2 is a block diagram of an exemplary network that may be used in accordance with an embodiment of the present invention.

FIG. 2 is a block diagram of an exemplary network 200 that may be used in accordance with an embodiment of the present invention. For example, network 200 of the present embodiment enables one or more client computer systems (e.g., 204, 206 and/or 208) to receive high fidelity media content "on-demand" from a media content server 212 via the Internet 202 while restricting unauthorized users from directly retrieving media content from its source database stored by content server 212.

Network 200 of FIG. 2 includes web application server 210 and content server 212 which are communicatively coupled to the Internet 202. Additionally, web application server 210 and content server 212 may be communicatively coupled together within out utilizing Internet 202. Furthermore, network 200 includes client computers 204, 206 and 208 which are each communicatively coupled to the Internet 202. In this manner, web server 210, content server 212, and client computers 204-208 are able to communicate. It should be appreciated that the devices of network 200 of the present embodiment are well suited to be coupled in a wide variety of implementations. For example, content server 212, web server 210, and client computers 204-208 of network 200 may be coupled via wired communication technology (e.g., coaxial cable, copper wire, fiber optics, and the like) and/or wireless communication technology.

Within network 200, it is understood that web server 210, content server 212 and client computers 204-208 may be implemented in a variety ways in accordance with the present embodiment. For example, web server 210, content server 212 and client computers 204-208 may be implemented in a manner similar to computer system 100 of FIG. 1. However, these devices of network 200 are not strictly limited to such implementation. Additionally, web server 210 and content server 212 of the present embodiment perform a variety of functionality within network 200. It is understood that web server 210 and content server 212 may actually reside on a single physical computing device (e.g., computer 100 of FIG. 1). However, web server 210 and content server 212 of the present embodiment may each be implemented as one or more physical computing devices.

It is appreciated that network 200 of FIG. 2 is able to operate with and provide delivery of any type of media content (e.g., audio, video, multimedia, graphics, information, data, software programs, and/or the like) in any type of format. For example, the content server 212 may provide audio clips, video clips, and the like to client computers 204-208 via the Internet 202.

Exemplary Operations in Accordance with the Present Invention

Figure 3:
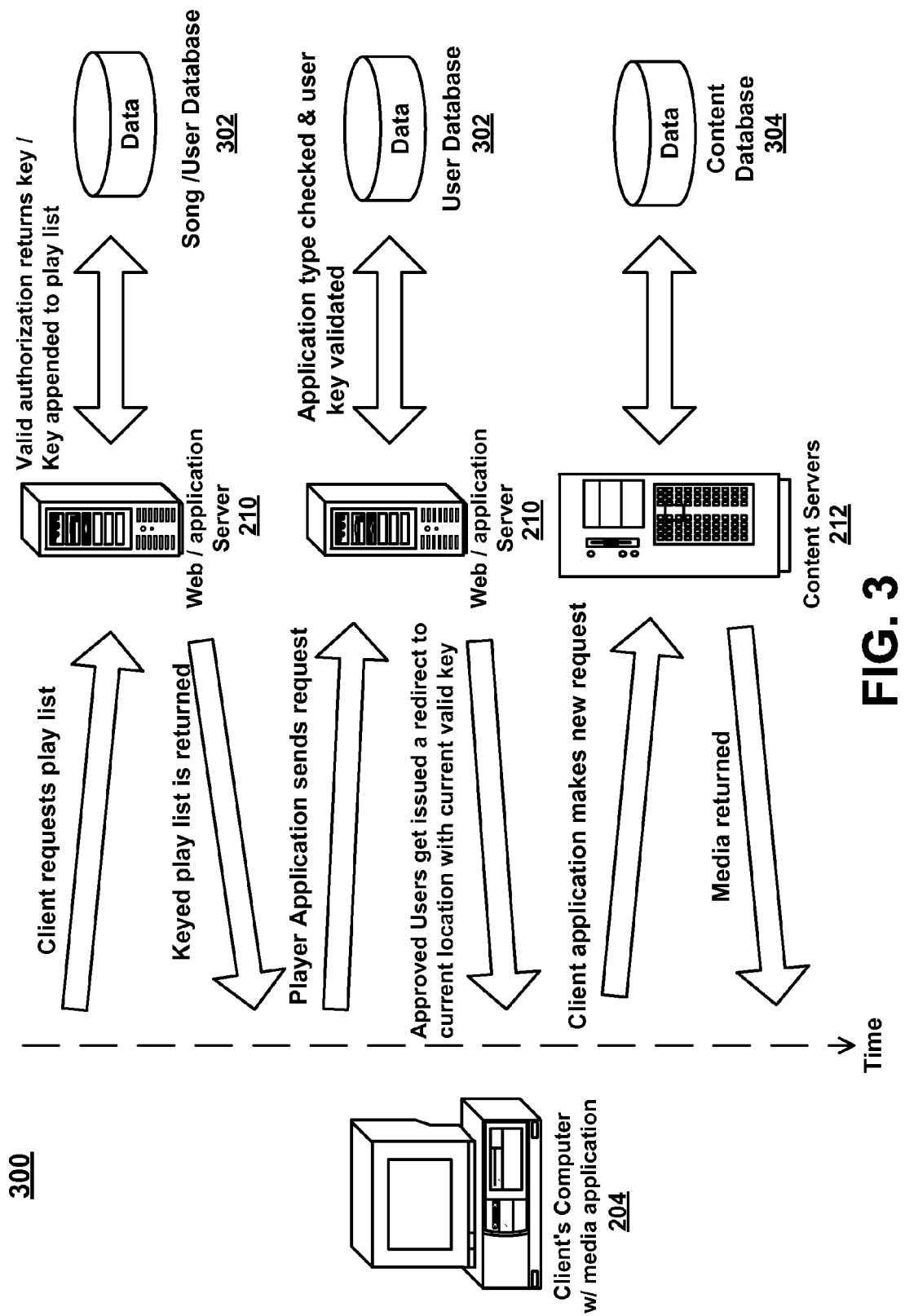
FIG. 3 is a block diagram of an exemplary system for implementing access keys in accordance with an embodiment of the present invention.

FIG. 3 is a block diagram of an exemplary system 300 for implementing access keys in accordance with an embodiment of the present invention. Specifically, system 300 illustrates a client computer system (e.g., 204) utilizing access keys in order to receive high fidelity media content "on-demand" from a media content server (e.g., 212) while unauthorized users or media applications are restricted from directly retrieving and/or copying media content from its media source database (e.g., 304).

The client computer device 204 may communicatively couple with a web/application server (e.g., 210) in order to request a media play list. In response, the web server 210 may determine whether the user of client 204 is authorized to receive the media play list associated with the request. The web server 210 may utilize a user database 302 in order to determine if a user is authorized to receive a media play list. If not, web server 210 does not provide client computer 204 the requested media play list. However, if client 204 is authorized, web server 210 transmits the media play list to the client device 204 (e.g., via Internet 202) along with an appended user key or user identification (ID). It is understood that user database 302 may also include data for one or more media play lists that may be utilized to provide a media play list to client computer 204. Subsequently, the user of client device 204 may utilize the received media play list in combination with a media player application operating on client device 204 in order to transmit a delivery request (that automatically includes the user key or user ID) for one or more desirable pieces of media content to web server 210.

Upon reception of the media content delivery request, the web server 210 of FIG. 3 checks the validity of the requesting media application along with the attached user key. The web server 210 may utilize user database 302 in order to check the validity of the user key (or user ID) and the requesting media application. If either or both are invalid, web server 210 redirects the unauthorized client computer 204 so that it may be handled in an appropriate manner in order to prevent abuse of the system. However, if both the requesting media application and user ID are valid, web server 210 issues to client device 204 a redirect command to the current address location of the desired media content along with a time sensitive access key (e.g., for that day, hour, or for any defined timeframe).

In response to reception of the redirect command, the media player application operating on client computer device 204 automatically issues a new request along with the time sensitive access key to content server 212 for delivery of the one or more desired pieces of media content. The content server 212 determines the validity of the time sensitive access key. If invalid, content server 212 redirects the unauthorized client device 204 so that it may be handled in an appropriate manner in order to prevent access to the media content. However, if the time sensitive access key is valid, content server 212 retrieves the desired media content from a media content database 304 and then transmits it to client device 204 for use by its media player application. It is understood that the delivered media content may be stored by client computer 204 using hidden directories thereby preventing future unauthorized distribution of it.

Figure 4A:
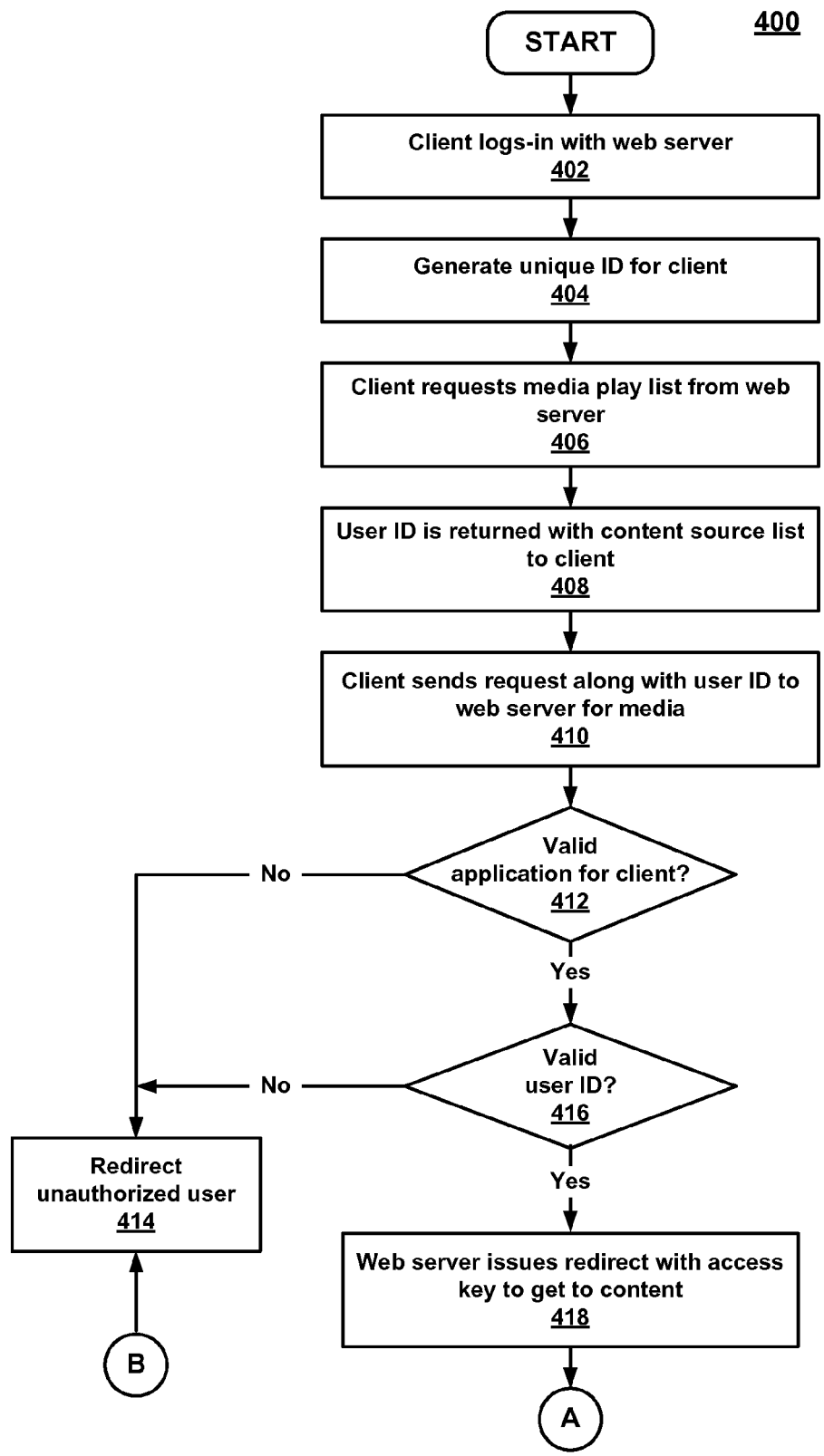
FIGS. 4A and 4B are a flowchart of steps performed in accordance with an embodiment of the present invention for providing media content to a client computing device.
Figure 4B:
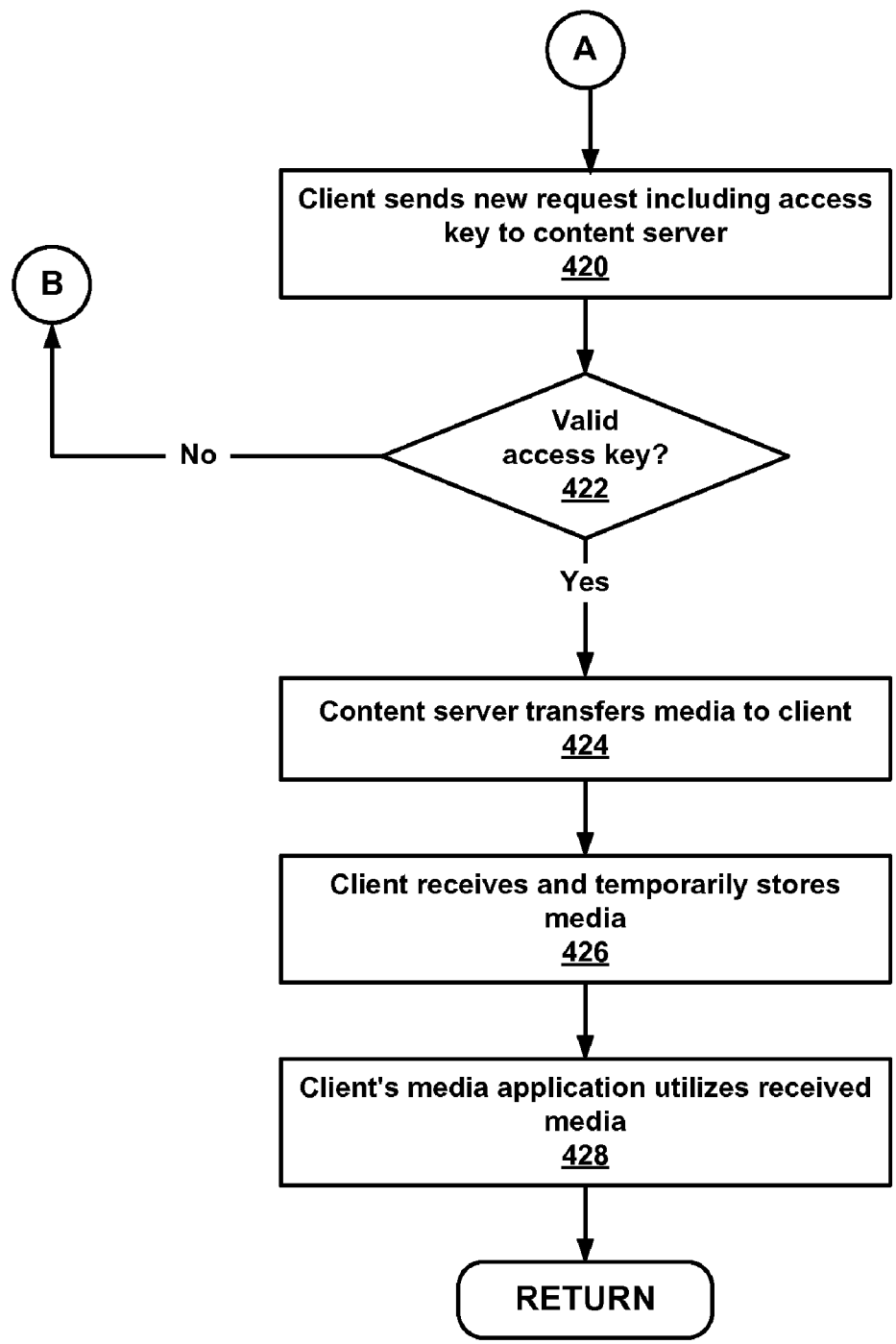

FIGS. 4A and 4B are a flowchart 400 of steps performed in accordance with an embodiment of the present invention for providing media content to a client computing device (e.g., 204, 206 or 208). Flowchart 400 includes processes of the present invention which, in one embodiment, are carried out by a processor(s) and electrical components under the control of computer readable and computer executable instructions. The computer readable and computer executable instructions may reside, for example, in data storage features such as computer usable volatile memory 104, computer usable non-volatile memory 106 and/or computer usable mass data storage device 118. However, the computer readable and computer executable instructions may reside in any type of computer readable medium. Although specific steps are disclosed in flowchart 400, such steps are exemplary. That is, the present invention is well suited to performing various other steps or variations of the steps recited in FIGS. 4A and 4B. Within the present embodiment, it should be appreciated that the steps of flowchart 400 may be performed by software, by hardware or by any combination of software and hardware.

The present embodiment enables delivery of "on-demand" high fidelity media content to computer devices via one or more communication networks (e.g., the Internet) while restricting unauthorized users from directly retrieving media content from a source database. Once the computer device receives the media, it may be stored using hidden directories so that it may not be easily shared with others. Within the present embodiment, there are different functionality that are implemented in order to protect and monitor the media content source. For example, the actual address location of the media database is hidden from content recipients while its address directory is periodically change making past addresses obsolete. Furthermore, an access key procedure and rate control restrictor may also be implemented to monitor and restrict suspicious media content requests. By implementing these and other functionality, the present embodiment restricts access to and redistribution of delivered media content and provides a means for compensating owners of copyrighted media content.

It should be appreciated that flowchart 400 is described in conjunction with FIG. 2 in order to more fully describe the operation of the present embodiment. At step 402 of FIG. 4A, a client computer (e.g., 204) communicatively couples to a web server (e.g., 210) via one or more communication networks (e.g., Internet 202) and then proceeds to log in. The initial log in process of step 402 may be implemented in a wide variety of ways in accordance with the present embodiment. For example, the initial log in process may involve a registration process provided by web server 210 wherein different identifying information may be provided by a user of client computer 204 such as, but not limited to, his or her name, address, phone number and credit card information. The present embodiment may then cause web server 210 to verify the truthfulness of the provided registration information. Furthermore, the registration process may include the user of client device 204 establishing with web server 210 a user selected identity and password.

However, if the user of client computer 204 has already participated in the registration process, the log-in process of step 402 may include web server 210 requesting that the user of client device 204 provide his or her previously established user identity and password. As such, the user of computer 204 causes it to transmit his or her user identity and password to web server 210. Upon receiving them, web server 210 determines their validity. If they are invalid, web server 210 refuses access to client computer 204 wherein flowchart 400 may be discontinued. However, if the provided user identity and password are valid, the present embodiment proceeds to step 404.

At step 404, once the registration process is completed, the present embodiment causes web server 210 to generate a unique user identification (ID) or user key associated the user of client device 204 that participated in the initial log-in process of step 402. The unique user ID (or user key) is then stored by web server 210 in a manner that it is associated with that registered user. In this manner, the present embodiment is able to uniquely identify each authorized user of web server 210. It is appreciated that if a unique user ID has already been generated for a user that logs in with web server 210 at step 402, the present embodiment may skip step 404 and proceed to step 406.

In step 406 of FIG. 4A, the user of client computer 204 causes it to transmit to web server 210 (e.g., via Internet 202) a request for a play list of available media content. It is understood that the requested media play list may include all or a portion of the media content available from content server 212.

At step 408, in response to web server 210 receiving the play list request, the present embodiment causes web server 210 to transmit to client computer 204 a media content play list together with the unique user ID associated with the logged-in client. The user ID may be attached to the media content play list in a manner such that the user of computer 204 is unaware of it. It is appreciated that the media content of flowchart 400 may include, but is not limited to, high fidelity music, audio, video, graphics, multimedia, and the like. The media content play list of step 408 may be implemented in diverse ways. For example, the present embodiment may generate a media content play list by taking all of the media content titles available from the content server 212 and combining them into a single list. Alternatively, all of the media content titles (or different lists of titles) may be loaded from content server 212 and passed to a Common Gateway Interface (CGI) program operating on web server 210 that may be written in Perl (Practical Extraction and Report Language) Script, where the media titles (or different lists of titles) are concatenated into a single dimensioned array that may be provided to client device 204.

In step 410 of FIG. 4A, the user of client computer 204 may utilize the received media content play list in conjunction with a media player application in order to cause client device 204 to transmit a request to web server 210 for delivery of particular media content, wherein the user ID automatically accompanies the request. The media delivery request of the present embodiment may be implemented in a wide variety of ways. For example, the media content play list provided to client device 204 by web server 210 may enable the user to create one or more customized media play lists by selecting desirable media content titles. It is understood that a customized media play list may establish the media content that eventually will be delivered to client computer 204 along with the sequential order in which it will be delivered. Furthermore, the user of client device 204 may create as many or as few customized play lists as desired and then store them with computer 204 (e.g., to its desktop) and/or within web server 210. It is noted that a customized media play list does not actually contain media content, but instead it includes one or more identifiers of specific pieces or portions of media content such as, but not limited to, a song, an audio clip, a video clip, a picture, a graphic picture, a multimedia clip, and the like.

The following Perl Script entitled "User Choice Program" is an exemplary implementation for providing a media play list to enable a user of a computer (e.g., 204) to generate a request for media delivery by creating one or more customized play lists.

```
#!/usr/bin/perl -w
#---------------------------------------------------------------------------------
#                  User Choice Program
#  This program reads in a mp3 play list source file, displays the file names,
#  on a web page to allow for selection, and creates a new playlist file to download.
#  Programmer: Ted Fitzgerald
#  Created for: "themomi.org"
#---------------------------------------------------------------------------------
$VERSION = "5.0";
$ENV{'PATH'} = '/bin:/usr/bin:/usr/local/bin';
# ---- declare some variables used in the code program ------------------ #
# ---- Don't touch these --- #
my $dir_cnt = 0; #counter
my $qry1 = "";
my $qry2 = "";
my $sql = "";
# -------------YOU CAN/SHOULD LOCALIZE THESE VARIABLES ------------------- #
my $rootdir = "mp3";
my $image_path = "http://www.themomi.org/museum/images";
```

```
my $image_url = "www.themomi.org/$rootdir";
my $song_root = "../htdocs/";
my $earthc = "themomi.earthc.net";
# ----------------- Start Code ------------------------------------------ #
$|=1; #flush
print "Content-type: text/html\n\n"; # send basic header
use CGI qw(:standard);
use CGI::Carp('fatalsToBrowser');
use DBI( );
use strict;
my $db_host = "AAA.BBB.CCC.DDD";
my $dbh = DBI->connect("DBI:mysql:database=mpb;host=$db_host",
                       "NOBODY", "ASK_FOR_JOE",
                       {'RaiseError' => 1}) or die "can't connect to db";
my @play_list;
my $artist;
my $song_name;
print<<HTML_DONE;
    <html>
    <head>
    <META NAME="Organization" CONTENT="www.themomi.org">
    <META NAME="Author" CONTENT="Ted Fitzgerald">
    <META NAME="Quote" CONTENT="My hovercraft is full of eels!">
    <META NAME="Description" CONTENT="Music selection / creation software">
    <SCRIPT LANGUAGE="JavaScript">
    <!--
      function changeImages( ) {
          for (var i=0; i<changeImages.arguments.length; i+=2) {
              document[changeImages.arguments[i]].src = changeImages.arguments[i+1];
          }
      }
    // -->
    </SCRIPT>
    <style><!--a{text-decoration:none}//--></style>
    <style><!--a:hover{color:#3399cc; }--></style>
    </head>
    <body bgcolor="black">
    <font size=2 color=white face = arial,san serif, helvetica >
    <form method="post">
HTML_DONE
#----------------- Main page display starts here (selection portion -------------- #
# if first time page is displayed submit button hasn't been clicked and submit.blah is undefined.
# we use this parameter to show initial selection or results portion of page
if(! defined(param("Submit.x"))){ #if first time page is displayed submit is undef
print<<HTML_DONE;
    <center>
    <a id="button"> </a>
    <a name="button"> </a>
    <input type="image" value="Submit" src="$image_path/oy.gif" border="0" alt="Create
Playlist" name="Submit">
    <!-- <A HREF="http://www.themomi.org/perl/choose_hi.cgi"
         ONMOUSEOVER="changeImages('oy', 'http://www.themomi.org/museum/images/oy.gif');
return true;"
         ONMOUSEOUT="changeImages('oy',
'http://www.themomi.org/museum/images/oy_over.gif'); return true;">
    <IMG NAME="oy" SRC="http://www.themomi.org/museum/images/oy.gif"
BORDER=0></A> -->
    <br><br>
    <input type=Reset value="Reset" name=Reset>
    </center>
HTML_DONE
# ------------------------------ MAIN CODE STARTS HERE ----------------------------- #
  my $sql = "select distinct playlist_name from m3u";
    $sql .= " order by playlist_name";
  my $sth = $dbh->prepare($sql);
    $sth->execute( );
  while (my $ref = $sth->fetchrow_hashref( )) {
    my $playlist_name = $ref->{'playlist_name'};
    push(@play_list,$playlist_name);
    my $even = $dir_cnt % 2; # flip flop the output to make 2 columns odd = left even = right
    #make left right columns
    if(($even)) {
        print "<td align=center valign=top width=50%>";
    } else {
    print "<table align=center border=0 width=90% bordercolor=black name=outer>"; #start
outer table
    print "<tr><td align=center valign=top widht=50%>";
    }# end if
    print "<br><br><img src=http://$earthc/$image_url/$playlist_name/cover.jpg
align=center><br><br>";
```

```
    print "<table border=0 align=center width=90% bordercolor=black name=internal_table>";
    print "<tr><td><input type=checkbox name=d$dir_cnt></td>";
    print "<td><font size=2 color=white face = arial,san serif, helvetica >";
    print " --- Select All in Category ---</font>";
    print "</td></tr>";
        my $sql1 = "select pl_index,artist,song_name from m3u where playlist_name like\"$playlist_name\"";
        # print "$sql1<br>";
        my $sth1 = $dbh->prepare($sql1);
        $sth1->execute( );
        while (my $ref1 = $sth1->fetchrow_hashref( )) {
            my $id = $ref1->{'pl_index'}; $artist = $ref1->{'artist'}; $song_name = $ref1->{'song_name'};
            $artist =~ s/_/ /g;
            $song_name =~ s/_/ /g;
            print "<tr><td><input type=checkbox name=\"$id\"></td>\n";
            print "<td><font size=2 color=white face = arial,san serif, helvetica >$artist - $song_name<br></font></td></tr>\n";
        } #end while ref1
        print "</table>"; # end inner table
        if($even) {
            print "</td></tr>";
            print "</table>"; #end outer table
            print "<center><br><font size=2 color=white face = arial,san serif, helvetica >";
            print "<a href=\"#button\">Return to top</a></font></center>";
        }else{
            print "</td>";
        } #end ending left right column if
    $dir_cnt++; # increment counter used for left/right flip flop
 } #end while ref -> display of play lists loop
#----------------------------------------------------------
 print "<br><br>";
 print "<input type=hidden name=size value=$dir_cnt>";
 # $dbh->disconnect( );
print " </form>";
} #end if (Submit)
#-- done displaying the selection list --
#------------------------------------------------------------------------------#
# ---------------- DISPLAY RESULTS OF SELECTIONS ---------------------------- #

#------------------------------------------------------------------------------#
if(defined(param("Submit.x")) || defined(param("Submit.x"))){
    my @play_list;
    my @list_copy;
    my @p_list;
    my $pl;
    my $first_pl;
    my $qry1,
    my $qry2;
    #$num_of_dirs = param("size");
# ==================================================================
    #my $sql = "select distinct playlist_name from m3u order by playlist_name asc";
    my $sql = "select distinct playlist_name from m3u";
        $sql .= " order by playlist_name";
    my $sth = $dbh->prepare($sql);
    $sth->execute( );
 while (my $ref = $sth->fetchrow_hashref( )) {
    my $playlist_name = $ref->{'playlist_name'};
    push(@play_list,$playlist_name);
 } #end while "get all playlists" query
# ==================================================================
# ---------------------------------------------------------------------------
# parse param list for "all in playlist" request = "d+some num" & individual songs "num"
# ---------------------------------------------------------------------------
my @song_list;
#my $pl_limit = 5;
#my $song_limit = 50;
#my $pl_count = 1;
foreach (param( )) {
    push(@song_list,$_) if /^\d+$/;     #just a song number
    # print "<br>$_" if /^\d+$/;
    if (/^d\d+$/){          #all in playlist d+number
        s/d//;              #remove letter "d"
        push(@p_list,$play_list[$_]); #store playlist number
        push(@list_copy,$play_list[$_]);
    } # end if "d+numb all in playlist "
} # end foreach "item in param( ) list"
# ------------------------------------------------------------
#       Build "All in playlist" query string
# ------------------------------------------------------------
```

```
if(@p_list){
  my $first_pl = shift @p_list;
  my @list_copy = $first_pl;
  $qry1 = "SELECT * FROM m3u WHERE playlist_name IN ( \"$first_pl\"" ;
  foreach my $pl (@p_list){
#    last if($pl_count = $pl_limit);
    #print "<br>=". @p_list; #print "<br>@p_list";
    $qry1 .= ", \"$pl\" ";
    push(@list_copy,$pl);
#    $pl_count++;
  } #end foreach loop to build items in query string
  $qry1 .= ") order by playlist_name"; #    query ends here
  #print "<br>$qry1";
} #end if anything in p_list array
# -----------------------------------------------------------
#      Build individually selected songs query string
# -----------------------------------------------------------
if(@song_list){ #anyone home in song lists? go for it!
  my @song_copy = @song_list;
  my $first = shift @song_list;
  $qry2 = "SELECT * FROM m3u WHERE pl_index IN ( $first" ;
  foreach my $blarg (@song_list){
    #print "<br>=". @song_list;
    #print "<br>@song_list";
    $qry2 .= ", $blarg ";
  } #
  $qry2 .= ")";
#  $qry2 .= " limit $song_limit"; #add limit to number of songs
  #print "<br>$qry2";
} #end if anything in song_list array
# -----------------------------------------------------------
#      Now create m3u playlist file
#      Execute query statement(s) and write file
# -----------------------------------------------------------
#print "<br>here's your check of array size greater than zero
defined($qry1),defined($qry2)<br>";
if($qry1 || $qry2){
  # ---- Create unique play list name using numbers from date parts --------- #
  my $theDate = localtime;
  $theDate =~ /(\d+):(\d+):(\d+)\b/i;
  my $play_list_name = "Momi_playlist_$2$3.m3u";
  # --------------------------------------------------------------------- #
  print "<center><font size=2 color=white face = arial,san serif, helvetica >";
  print "<b>Songs in your play list:</b></font></center>";
  print " <table align=center>";
  open(OUTFILE,">../htdocs/temp/$play_list_name");
  print OUTFILE '#EXTM3U' ."\n"; #write file header
  #print '<br>#EXTM3U<br>'; #write file header
  if($qry1){
    my $list = "";
    # now do the playlists
    my $sth1 = $dbh->prepare($qry1);
    $sth1->execute( );
    while (my $ref1 = $sth1->fetchrow_hashref( )) {
      my $playlist_name = $ref1->{'playlist_name'};
      my $pl_header = $ref1->{'pl_header'};
      my $song_url = $ref1->{'song_url'};
      $song_url =~ s/8080/8081/g;
      print OUTFILE "$pl_header\n$song_url\n";
    } # end while
    #print "<b>my list_copy array = @list_copy</b><br>";
    foreach my $list (@list_copy){
      $list =~ s/_/ /g;
      print "<tr><td><font size=2 color=white face = arial,san serif, helvetica >All Songs from <b>\"$list\"</b></font></td></tr>\n";
    } # end foreach
  }#end if $qry1 is defined
  if($qry2){
    # now do the selected songs
    my $sth2 = $dbh->prepare($qry2);
    $sth2->execute( );
    while (my $ref2 = $sth2->fetchrow_hashref( )) {
      my $artist = $ref2->{'artist'};
      my $song_name = $ref2->{'song_name'};
      my $pl_header = $ref2->{'pl_header'};
      my $song_url = $ref2->{'song_url'};
      #print "$pl_header<br>$song_url<br>" ;
      $artist =~ s/_/ /g;
      $song_name =~ s/_/ /g;
      $song_url =~ s/8080/8081/g;
```

```
    print "<tr><td><font size=2 color=white face = arial,san serif, helvetica >$artist -
$song_name</font></td></tr>";
        print OUTFILE "$pl_header\n$song_url\n";
    } # end while
}# end if $qry2 is defined
close OUTFILE;
print "</table>";
print "<center><br><br><br>";
print "<a href=\"http://www.themomi.org/temp/$play_list_name\">";
print "<img src=\"http://www.themomi.org/museum/newimages/create_now.gif\"
border=0></a>";
print "</font>";
print "<br><br><br>";
# ---------------- include text for nubies --------------------------------- #
print "<br><br>";
print "<table align=center border=0 width=90%>";
print<<MORE;
<tr><td width=40% align=center>
<font face="Arial,Helvetica,sans-serif" color="#6699cc" size="3">
<b>Left click<br> (Mac: single click)</b><br> on the button above to launch
 your playlist<br> with your favorite .mp3/.m3u player
</td>
<td align=center width=10%><font face="Arial,Helvetica,sans-serif" color="gold" size="4">--
OR --</font></td>
<td align=center width=40%><font face="Arial,Helvetica,sans-serif" color="#6699cc"
size="3">
<b>Right click<br> (Mac: ctrl + single click)</b><br> on the button above and
use "save target as"<br>to save your playlist file to your computer.</font>
</td></tr>
<tr><td colspan=3 align=center>
MORE
#<font size="2" face="Arial,Helvetica,sans-serif" color="white"><br>
#Note: the music itself will not be saved locally <br> You will only be downloading one small
.m3u file which will
#play the songs from MPB.TV whenever you wish</font><br>
#</td></tr>
print "</table><br><br>";
    }else{
    print "<br><b>Nothing Selected</b><br>";
    #foreach (param( )) {
    #   print "$_<br>";
    #}#end foreach
    #print "The value of Param(\"Submit.x\") is " , param("Submit.x") , "<br>";
    #print "The value of defined Param(\"Submit.x\") is " , defined(param("Submit.x")) , "<br>";
    $dbh->disconnect( );
    }#end if defined queries
}# end if (Submit.x) "display results of selection "
    print "</body>";
print end_html( );
#bye bye! Thanks for visiting!
exit(0);
1;
```

Alternatively, at step 410, the received media content play list may include a random media content delivery choice that the user of client device 204 may select to transmit a request to web server 210 for delivery of random media content, wherein the user ID automatically accompanies the request. An embodiment for implementing the delivery of media content in a random manner to client computer 204 is described in detail within reference to step 424.

At step 412 of FIG. 4A, the present embodiment causes web server 210 to determine whether the requesting media application operating on client computer 204 is a valid media application. One of the main functions of a valid media application may be that it is a player of media content as opposed to an application that downloads media content in an unauthorized or unregulated manner. If the web server 210 determines at step 412 that the requesting media application operating on the request client computer 204 is a valid media application, the present embodiment proceeds to step 416. However, if the web server 210 determines at step 412 that the requesting media application is not a valid application, the present embodiment proceeds to step 414.

In step 414, the present embodiment causes web server 210 to redirect client computer 204 so that it is prevented from accessing the source of the media content. It is understood that the redirection of step 414 may be performed in diverse ways. For example, the present embodiment may cause web server 210 to redirect client computer 204 to a software program that identifies it, logs it out of web server 210 and prevents any subsequent logging in of it for a defined amount of time (e.g., 10 minutes, an hour, a day, a month, a year, or any defined amount of time).

At step 416, the present embodiment causes the web server 210 to determine whether the user ID (or user key) that accompanied the media delivery request sent by client computer 204 is valid. If the web server 210 determines that the user ID is not valid at step 416, the present embodiment proceeds to step 414. However, if the web server 210 determines that the user ID is valid at step 416, the present embodiment proceeds to step 418. It is noted that the order in which steps 412 and 416 are performed by the present embodiment may be switched from the order illustrated within FIG. 4A. That is, the present embodiment may perform step 416 before performing step 412.

In step 418 of FIG. 4A, the present embodiment causes web server 210 to transmit to client computer 204 a redirection command along with a time sensitive access key (e.g., for that day, hour, or for any defined timeframe) thereby enabling the client to eventually receive the requested media content. The redirection command may include a time sensitive address of where the media content is location within content server 212. The address is time sensitive because periodically the present embodiment of content server 212 renames some or all of the media address directories thereby making previous content source addresses obsolete. It is noted that the actual location of the media content may not change within content server 212, just the address of the content is changed. However, the locations of the media content may actually be changed along with the corresponding addresses. In any case, unauthorized users and/or applications are restricted from directly retrieving and/or copying the media content from content server 212. As such, if someone with inappropriate intentions is able to find out where the media content source is stored, the next time he or she tries to use that route (or address) it does not exist anymore thereby preventing further unauthorized access.

It is noted that within an embodiment of the present invention, the addresses (or routes) of content server 212 that are actively coupled to one or more client devices (e.g., 204-208) are maintained while future addresses (or routes) are being created for new client devices. It is appreciated that as client devices are uncoupled from the media content source of content server 212, that directory address (or link) may be immediately changed thereby restricting access to unauthorized client devices or applications.

Alternatively, the functionality of redirection to a media content source may be implemented by utilizing a server network where multiple servers are content providers (e.g., 212) or by routing a requesting client device (e.g., 204, 206 or 208) through multiple servers. Within another embodiment in accordance with the present invention, the delivery of media content from a central content provider (e.g., 212) may be routed through one or more intermediate servers before being received by the requesting client device (e.g., 204, 206 or 208).

The redirection functionality of step 418 is well suited to be implemented in a wide variety of ways. The following Perl Script entitled "Redirector Program" includes an exemplary implementation for the redirection functionality of step 418 along with other functionality of flowchart 400. Additionally, this Perl Script records the Internet Protocol (IP) addresses of the client computers (e.g., 204), the media content requested and its transfer size. In this manner, an implementation of flowchart 400 is able to accurately meter royalty payments, clock usage and transfers, and also keep a log of media content popularity.

```
#!/usr/bin/perl -w

#-------------------------------------------------------------------------------
```

```perl
    open (APACHE_LOG, ">>$apache_log") or warn "Waaaa! Can't open $apache_log";
        $a_str = "$remote_host_ip - - $apache_date \"$whole_request\" 302 2 \"$program_name\" \"$ua\"";
      print APACHE_LOG "$a_str\n";
     close APACHE_LOG;

if($bad || $ua eq "unknown" ){
     $first_line =~ s/[\r\n]//g;
     open (ERROR_LOG,">>$error_log");
     my $e_str = "$remote_host_ip - - $apache_date \"$first_line\" 400 2 \"$short_name\" \"$u_a_line\"";
      print ERROR_LOG "$e_str\n";
      close ERROR_LOG;
     }#end if error close STDOUT;
     close STDERR;
     close STDIN;

exit(0);   # Child process return status and exits when done.
   } # else 'tis the parent process, which goes back to accept()
}
$dbh->disconnect();
close ($server);
exit(0);
```

```
#              Redirector Program
#--------------------------------------------------------------------------------
#  This program obscures the proper address of the mp3 source file for due diligence
#  purposes and records the requested mp3 file name, requestor ip number, file size
#  and date of request to allow for accurate royalty payments & bandwidth monitoring,
#  The resulting data is stored in a .csv file for ease of subsequent analysis.
#  This program also directs known web browsers to the index page rather than the
#  the mp3 file.

#  Programmer: Ted Fitzgerald
#  Created for: "themomi.org"
-------------------------------------------------------------------------- # my $version = 4.0;

--------------------------------------------------------------------------

$SIG{CHLD} = "IGNORE";  #$kill zombies! Oooo scary scary!;
use IO::Socket::INET;
use DBI();

my $debug = 0; #debugging messages on/off

################## localize these variables ############################

# server_port: what socket to use = 8080, 8181, 8200, 8282 for hi,mid, low,extra_low
# mp3_root_dir: the name of the root dir that contains the mp3 files
#      choices are: changing all the time
# real_dest_url: location of the content server
# send_away_url: location that browsers are sent to if the try to access mp3s.

#program name
my $level       = "hi";         # hi , mid, lo, x_lo;
my $short_name  = $level . "_redir.cgi";
my $program_name = "http://www.themomi.org/redirs/$short_name";

# logs
my $apache_log = "/usr/local/apache/logs/access_$level.log";
my $error_log = "/usr/local/apache/logs/error_$level.log";

#port
my $server_port = 8081;
```

```perl
#urls
my $real_dest_url = "www.mpb.tv";
my $send_away_url = "www.themomi.org";

#db connection
my $db_host = "AAA.BBB.CCC.DD";
my $db_user = "my user name";
my $db_pw   = "some password";

my $dbh = DBI->connect("DBI:mysql:database=mpb;host=$db_host",
            "$db_user", "$db_pw",
            {'RaiseError' => 1}) or die "can't connect to db";

#rate control songs/min limit
my $limit = 10;

# Changeable access parameters read in from database
my $mp3_root_dir;
my $pass_key;

change content directory names to prevent direct linking my $sql_db  = "Select dir from file_location ";
   $sql_db .= "where band like \"$level\"";
 my $sth_db = $dbh->prepare($sql_db);
   $sth_db->execute();
 my $ref_db = $sth_db->fetchrow_hashref();

$mp3_root_dir = $ref_db->{'dir'};
   $sth_db->finish();

if(!defined($mp3_root_dir)) {
print "oops!\n";
#--------------------------------
# $mp3_root_dir = "hi_band";
  $mp3_root_dir = "Fatty";
# $mp3_root_dir = "ookii";
#-------------------------------
# $mp3_root_dir = "mid_band";
# $mp3_root_dir = "chu";
# $mp3_root_dir = "norman";
#-------------------------------
# $mp3_root_dir = "lo_band";
```

```perl
# $mp3_root_dir = "chisai";
# $mp3_root_dir = "Slim_Jim";
#-------------------------------
# $mp3_root_dir = "x_lo_band";
# $mp3_root_dir = "chibi";
# $mp3_root_dir = "Ally_McBeal";
#-------------------------------

} #end if my $sql_key = "Select cache_key from cache_key ";
my $sth_key = $dbh->prepare($sql_key);
  $sth_key->execute();
my $ref_key = $sth_key->fetchrow_hashref();

$pass_key = $ref_key->{'cache_key'};
  $sth_key->finish();

###########################################################################

my $msg = "debug mode off";
while ($_ = $ARGV[0]) {
   shift;
   #print "found $_ \n";
   last if /^--$/;
   if (/^-D/i || /^-X/i || /^-V/i) {
     $msg = "debug mode on";
     $debug = 1;
   }
}#end while print "\nStarted program: $short_name Version: $version at Port: $server_port $msg \n";
print " Using $real_dest_url/$mp3_root_dir as music source dir\n";

$server = IO::Socket::INET->new(LocalPort=> $server_port,
                  Type    => SOCK_STREAM,
                  Reuse   => 1,
                  Listen  => 100 )
     or die "Couldn't be a tcp server on port $server_port: $!\n";

################################################################ initialize variables used for player discrimination
my $ok = 1;      # on by default;
my $nsplayer = 0; # this is the windows media player
```

```perl
my $winamp = 0;   # this is the winamp player
my $real = 0;     # this is the real player
my $ripper = 0;   # this is for stream ripper etc.
my $speeder = 0;  # this is for speeders
my $what = "";
my $whole_request = "";
my $what_method = "";
my $what_song = "";
my $song_name = "song";
my $what_list = "list";
my $what_version = "";
my $first_line = "";
my $u_a_line = "";
my $ua = "unknown"; #generic entry
my $counter = 1;  #use counter to prevent runaway children
my $bad = 0;

# ------------------------------------------------------------------------ #
#     Now do main loop. fork off child when connection made
------------------------------------------------------------------------ # while ($client = $server->accept()) {
   $pid = fork(); #get return value from fork()
   die "Cannot fork: $!" unless defined($pid);
   if ($pid == 0) {
      # Child process starts here my $client_info = getpeername($client);
      (my $port, my $iaddr) = unpack_sockaddr_in($client_info);
      my $remote_host_ip = inet_ntoa($iaddr);
      my $remote_hostname = gethostbyaddr($iaddr, AF_INET); #put in real name
      my $date = localtime;

if(! defined($remote_hostname) ){ $remote_hostname = "unknown";}
       if($remote_host_ip =~ /10.10.0.252/o || $remote_host_ip =~ /10.10.0.251/o){
          exit(1);
       } if($debug){
          print "\n -------------------------------------------------------------------------------\n";
          print "$short_name: client ip  = " . $remote_host_ip . " client_hostname = " . $remote_hostname . " \n";
       } evaluate the first line
```

```perl
    $what = <$client>;
  #ignore network health check from x.x.x..104
      if(! defined($what) && $remote_host_ip !~ /209.10.35.104/){
          print "$short_name@$server_port encounterd a client who said nothing! $remote_host_ip , $date<-- \n "
;
          exit(1);
      }
      $first_line = $what;

if($debug){  print "\n  First line is \"" , $what , "\" \n";  }
      if ($what !~ /^(GET|HEAD)\s+/i) {  #valid requests must start with GET or HEAD
         if($remote_host_ip !~ /209.10.35.104/o){
           print "$short_name -> bad req HTTP/1.1 400, no GET HEAD, $remote_host_ip said:->$what<- \n";
         }
         print $client 'HTTP/1.1 400, "Bad Request"';
         exit(1);
      }
      if ($what =~ /$mp3_root_dir/i) {
         print "$short_name -> bad req HTTP/1.1 400, mp3_dir in request, $remote_host_ip said:->$what<- \n";
         print $client 'HTTP/1.1 400, "Bad Request"';
         exit(1);
      } banned ip list if ($remote_host_ip =~/132.239.12.77/
       || $remote_host_ip =~ /66.122.240.11/
       || $remote_host_ip =~ /63.17.233.236/ ) {
       #print " $short_name sending HTTP/1.1 400, baned $remote_host_ip \n said:->$what<-\n";
       print $client 'HTTP/1.1 400, "Bad Request"';
       exit(1);
    }
    #now parse line, extract what we need or dump 'em
    if ($what =~ /^([A-Z]+)\s+([\S]+)\s+HTTP\/([\d\.]+)\s*/){
       $whole_request = $what;
       $what_method = $1;
       $what_song = $2;
    $what_version = $3;
    }else{
       print " $short_name: sending bad client HTTP/1.1 400, Bad Request message\n";
       print " $short_name: bad req was: $what\n";
       print $client 'HTTP/1.1 400, "Bad Request"';
```

```
      exit(1);
    } print "method is > $what_method< song is >$what_song< version is >$what_version<
\n";

if ($what_method !~ /(GET|HEAD)/i) {
      exit(1);
   } now loop to get other info lines
   while( ($request = <$client>) ne ("\r\n" || "\r\n\r\n")  ){
    last if(! defined($request));
    $request =~ s/[\r\n]//g;
    if($debug) {
       print "<$level: $counter >The client said: " . $request ."<\n";
    }
     #------ WEB BROWSER INFO ------ #
    if($request =~ /Mozilla/io) {
            $ok = 0; $mozzy = 1; $request =~/.+:\s*(.+)$/; $ua = $1;
    }
    if($request =~ /Opera/io)   {
            $ok = 0; $mozzy = 1; $request =~/.+:\s*(.+)$/; $ua = $1;
    }
    if($request =~ /Omniweb/io) {
            $ok = 0; $mozzy = 1; $request =~/.+:\s*(.+)$/; $ua = $1;
    }
    if($request =~ /iCab/io)    {
            $ok = 0; $mozzy = 1; $request =~/.+:\s*(.+)$/; $ua = $1;
    }
    #------ MP3 RIPPER  INFO ------ #
    if($request =~ /StreamRipper/io) {
            $ok = 0; $ripper = 1; $request =~/.*:\s*(.+)$/; $ua = $1;
    }
    #------ No get for Wget ------ #
    if($request =~ /Wget/io) {
            $ok = 0; $ripper = 1; $request =~/.*:\s*(.+)$/; $ua = $1;
    }
    #------  FlashGet fizzles ------ #
    if($request =~ /FlashGet/io) {
            $ok = 0; $ripper = 1; $request =~/.*:\s*(.+)$/; $ua = $1;
    }
    #------ GetRight is Wrong ------ #
    if($request =~ /GetRight/io) {
            $ok = 0; $ripper = 1; $request =~/.*:\s*(.+)$/; $ua = $1;
    }
```

```
#------ Step on Spiders ------ #
if($request =~ /asterias/io) {
        $ok = 0; $ripper = 1; $request =~/.*:\s*(.+)$/; $ua = $1;
}
#------ Web access = No access ------ #
if($request =~ /Web access/io) {
        $ok = 0; $ripper = 1; $request =~/.*:\s*(.+)$/; $ua = $1;
}

#------ Monica gets the bone ------ #
if($request =~ /monica/io) {
        $ok = 0; $ripper = 1; $request =~/.*:\s*(.+)$/; $ua = $1;
}
#------ man what the hell is this?  ;-) ------ #
if($request =~ /Media Jukebox WinInet Reader/io){
        $ok = 0; $ripper = 1; $request =~/.*:\s*(.+)$/; $ua = $1;
}
#------ burn Nero Player ------ #
if($request =~ /NeroMediaPlayer/io) {
        $ok = 0; $ripper = 1; $request =~/.*:\s*(.+)$/; $ua = $1;
}
#------ 1SMUSIC is deaf ------ #
if($request =~ /1SMUSIC/io) {
        $ok = 0; $ripper = 1; $request =~/.*:\s*(.+)$/; $ua = $1;
}

#------ I know who Anonymizer is ------ #
if($request =~ /Anonymizer/io) {
        $ok = 0; $ripper = 1; $request =~/.*:\s*(.+)$/; $ua = $1;
}
#------ MP3 CLIENT INFO ------ #
if($request =~ /Windows-Media-Player/io){
        $ok = 0; $nsplayer = 1; $request =~/.+:\s*(.+)$/; $ua = $1;
}
if($request =~ /NSPlayer/io) {
        $ok = 0; $nsplayer = 1; $request =~/.+:\s*(.+)$/; $ua = $1;
}
if($request =~ /RMA/io)     {
        $ok = 0; $real = 1; $request =~/.+:\s*(.+)$/; $ua = $1;
}
if($request =~ /Winamp/io)    { $ok = 1; $request =~/.+:\s*(.+)\s*$/; $ua = $1; }
if($request =~ /QuickTime/io) { $ok = 1; $request =~/.+:\s*(.+)$/; $ua = $1;}
if($request =~ /Xaudio/io)    { $ok = 1; $request =~/.+:\s*(.+)$/; $ua = $1;}
if($request =~ /AppleApp/io)  { $ok = 1; $request =~/.+:\s*(.+)$/; $ua = $1;}
if($request =~ /iTunes/io)    { $ok = 1; $request =~/.+:\s*(.+)$/; $ua = $1;}
if($request =~ /Sonique/io)   { $ok = 1; $request =~/.+:\s*(.+)$/; $ua = $1;}
```

```
if($request =~ /xmms/io)    { $ok = 1; $request =~/.+:\s*(.+)$/; $ua = $1;}
if($request =~ /UPlayer/io) { $ok = 1; $request =~/.+:\s*(.+)$/; $ua = $1;}

#=== hold for error reportin ===#
if($request =~ /User Agent/io)   { $u_a_line = $request; } last if ($counter > 20 ); #we don't want some client babbling on and on
$counter++;

}#end while if($debug){
  print "User Agent = $ua \n";
  print "request  = $what_song \n";
  }

###### Rate controls to prevent excessive access to content $remote_host_ip =~ /.+.(.+)/;
my $last_octet_mod = $1;
# $last_octet_mod = $last_octet_mod % 1; #mod by number of tables we want
# my $time_offset = 1;

my $sql0  = "Select count(ip_address) as loser_count from loser ";
   $sql0 .= "where ip_address = \"$remote_host_ip\" ";
   $sql0 .= "AND user_agent = \"$ua\"";
my $sth0 = $dbh->prepare($sql0);
   $sth0->execute();
my $ref0 = $sth0->fetchrow_hashref();
my $loser_count = $ref0->{'loser_count'};
   $sth0->finish();

# #
if($loser_count <= 0 ){ my $sql  = "SELECT COUNT(request_time) as number_songs_reqs ";
  #$sql .= "MINUTE(MIN(request_time)) - MINUTE(now()) as duration  ";
   $sql .= "FROM rate_control_0 ";
   $sql .= "WHERE ";
   $sql .= "ip_address = \"$remote_host_ip\" ";
   $sql .= "AND ";
   $sql .= "user_agent = \"$ua\" ";
   $sql .= "AND ";
   $sql .= "request_time > now() - INTERVAL 60 SECOND";

print "\n$sql\n" if $debug;
```

```
    my $sth = $dbh->prepare($sql);
      $sth->execute();

my $ref = $sth->fetchrow_hashref();
    my $song_count = $ref->{'number_songs_reqs'};
    #my $duration = ($ref->{'duration'});
      $sth->finish();

print "\n Song count is $song_count \n" if $debug;

if($song_count >= $limit){
       $speeder =1;
       $ok = 0;
       print "\n Loser exceeded limit\n" if $debug ;

my $sql1 = "insert into loser (ip_address,user_agent,loser_time) values (\"$remote_host_ip\",\"$ua\",now()
)";
       my $sth1 = $dbh->prepare($sql1);
         $sth1->execute();
         $sth1->finish();
      }#end if song_count }else{
      print "\n loser is in loser table\n" if $debug;
      $speeder = 1 ;
      $ok = 0;
   } if(!$speeder){
     my $sql1  = "INSERT INTO rate_control_0 ";
       $sql1 .= "(ip_address,user_agent,request_time) ";
       $sql1 .= "VALUES (\"$remote_host_ip\",\"$ua\",now())";
     my $sth1 = $dbh->prepare($sql1);
    $sth1->execute();
    $sth1->finish();
   }#end if print $client "HTTP/$what_version 302 Found \r\n";
   print " I told him HTTP/$what_version 302 Found \n" if $debug;
   print $client "Date: $date \r\n";
   print $client "Server: Apache/1.3.20  \r\n"; #lie to 'em to keep 'em guessing.
   print $client "Keep-Alive: timeout=10, max=20\r\n";
```

```
#-------------- Good guys --------------- #
    if(($nsplayer || $real) && ! $speeder){
        print $client "Location:
http://$real_dest_url:80/$mp3_root_dir$what_song?arf=1$pass_key\r\n";
    #   print $client "Location: http://$real_dest_url:80/$mp3_root_dir$what_song\r\n";
        print "\nLocation:
http://$real_dest_url:80/$mp3_root_dir$what_song?arf=$pass_key\r\n" if $debug;
        print "found nsplayer or real player\n" if $debug;
    }
    if($ok && ! $speeder){
        print $client "Location:
http://$real_dest_url/$mp3_root_dir$what_song?arf=1$pass_key\r\n";
    #   print $client "Location: http://$real_dest_url/$mp3_root_dir$what_song\r\n";
        print "\nLocation: http://$real_dest_url/$mp3_root_dir$what_song?arf=$pass_key\n" if
$debug;
    #  print "other player that doesn't need to be told what port to go to\n";
    }
#-------------- Bad guys --------------- #
    if($mozzy){
        print $client "Location: http://$send_away_url/index.html\r\n";
    #   print "mozzy type web server being redirected to index page\n";
    }
    if($ripper){
        print $client "Location: http://$send_away_url/ring_of_hell/Pentiums.mp3\r\n";
    #   print "mozzy type web server being redirected to index page\n";
    }
    if( $speeder ){
        print "$short_name: Speeder @ $remote_host_ip sending bad client  HTTP/1.1 400, Bad
Request message\n";
        print "$short_name: Speeder said $what\n";
        print $client 'HTTP/1.1 400, "Bad Request"';
    }

$ok = 1;
    $nsplayer = 0;
    $mozzy = 0;
    $real = 0;

print $client "\r\n\r\n";
    # print "\ndone\n";
    # print "*****************************************************\n\n";

#   $dbh->disconnect();
    close $client;
```

```perl
    $what_song =~ /\/(.+)\/(.+)\.mp3/io;
    $what_list = $1;
    $song_name = $2;

#trash filter *************************************************************
    if(! defined($what_list)){
        print "$short_name: no list\n"; $what_list = "none\n";
    }
    if(! defined($song_name)){
        print "$short_name: no song_name $remote_host_ip\n"; $song_name = "none";
        $bad =1;
    }
    if(! defined($remote_hostname)){
        print "$short_name: no hostname\n"; $remote_hostname = "none";
        $bad = 1;
    }
    if(! defined($remote_host_ip)){
        print "$short_name: no host_ip\n"; $remote_host_ip = "none";
        $bad = 1;
    }
    if(! defined($remote_hostname)){
        print "$short_name: no hostname $remote_host_ip\n"; $remote_hostname = "none";
        $bad = 1;
    }
    if(! defined($ua)){
        print "$short_name: no ua\n"; $ua = "none";
        $bad = 1;
    } match this: APACHE LOG FORMAT (%h %l %u %t \"%r\" %s %b \"%{Referer}i\" \"%{User-agent}i\")
    #change date from: Fri Nov 16 16:33:26 2001 => [16/Nov/2001:16:32:33 -0500]

$date =~ /.+\s(.+)\s(.+)\s(.+)\s(.+)/io;
    my $month_name = "$1";
    my $day = "$2";
    my $time = "$3";
    my $year = "$4";

if ($day < 10){ $day = "0$day"; } #hack to add leading zero $month_name =~ s/ //g;
    #my $apache_date = "[$day/$1/$4:$3 -0500]";
    my $apache_date = "[$day/$month_name/$year:$time -0500]";
    $whole_request =~ s/\r//;
    $whole_request =~ s/\n//;
```

At step 420 of FIG. 4B, upon receiving the redirection command, the present embodiment causes the media application operating on client computer 204 to automatically transmit to content server 212 a new media delivery request (that automatically includes the time sensitive access key) that includes the address of the desired media content.

In step 422, the present embodiment causes content server 212 to determine whether the time sensitive access key associated with the new media delivery request is valid. If the content server 212 determines that the time sensitive access key is not valid at step 422, the present embodiment proceeds to step 414 of FIG. 4A. However, if the content server 212 determines that the time sensitive access key is valid at step 422, the present embodiment proceeds to step 424.

At step 424 of FIG. 4B, the present embodiment causes content server 212 to transmit the requested high fidelity media content to client computer 204. It is noted that when content server 212 transmits the media content to client computer 204 it does not encrypt the data stream. Additionally, content server 212 transmits the media content in a burst load (rather than a fixed data rate) that transfers to client device 204 as fast as its network transfer rate allows. The present embodiment may cause content server 212 to adapt its download speed to whatever network transfer rate the client computer's is able to handle. For example, if client computer 204 is coupled to the Internet 202 via a T1 communications line, content server 212 transfers the media content to client computer 204 at transmission speeds allowed by the T1 communications line. As such, once the requested high fidelity media content is transmitted to client computer 204, content server 212 is then able to transmit requested high fidelity media content to another client computer (e.g., 206 or 208). It should be appreciated that by performing step 424 in this manner, the delivery of high fidelity media content by the present embodiment becomes very efficient in terms of a statistical distribution over time and it does not overly congest the utilized communication network(s).

It is appreciated that the delivery of the media content to client device 204 by content server 212 at step 424 may be implemented in a wide variety of ways. For example, while delivering the media content to client computer 204 at step 424, a rate control restrictor functionality may be resident to content server 212 in order to monitor and limit "suspicious" media content retrieval. For instance, if a client device (e.g., 204) tries to retrieve media content from content server 212 faster than a predefined limit, the rate control restrictor uncouples client device 204 from its media content source (e.g., content server 212) and continues to restrict its access from the source for a predefined amount of time, as described herein. One of the reasons for implementing this rate control restrictor is to restrict access to those unauthorized applications that are designed to retrieve and/or copy media content from the source in an unauthorized manner. For example, a client device (e.g., 204) may be retrieving pieces of audio content at a rate determined to be much faster than is humanly possible to listen to in real time. As such, the rate control restrictor (which may be implemented with software and/or hardware) uncouples the client device from the media content source (e.g., content server 212) and restricts its access for a predefined amount of time.

Alternatively, an embodiment of the present invention may be implemented such that a user of a client device (e.g., 204) may establish a huge buffer of media content (e.g., audio clips, video clips, and the like) to be delivered by content server 212. However, the present embodiment at step 424 may just provide client computer 204 one piece of media content at a time as would be typically needed to utilize (e.g., listen to, watch, etc.) that piece of media content in real time.

Within another embodiment in accordance with the present invention, embedded keys and/or digital watermarks may be implemented within media content stored by content server 212 which may be delivered during flowchart 400 of FIGS. 4A and 4B. By using embedded keys and/or digital watermarks within the media content, it is easier to determine if some unauthorized person has been retrieving and/or copying media content from a media content source of content server 212. The embedded keys and/or digital watermarks within media content may include, but are not limited to, information indicating where the media came from, the identity of the media requestor and/or the identity of the requestor client device (e.g., 204, 206 or 208). With this information, it may be determined by the present embodiment who or what client device has been unauthorized in retrieving and/or copying media content from one or more of the media sources (e.g., 212). As such, that person and/or client device (e.g., 204, 206 or 208) can be permanently restricted by the present embodiment from requesting and/or accessing media content.

It is understood that if the user of client computer 204 caused it at step 410 to transmit to web server 210 a request for delivery of random media content, this request information may be communicated to content server 212 in order for it to fulfill the request at step 424. The delivery of media content in a random manner at step 424 may be implemented in diverse ways in accordance with the present embodiment. For example, a random media play list may be generated by first taking all of the titles of the media content stored by content server 212 and concatenated them into a single dimensioned array. Next, a random number may be generated. It is appreciated that a random number may be generated in a wide variety of ways in accordance with the present embodiment. For instance, a random number generator may incorporate as its product the combination of:

1. A number produced by a random function. It is noted that the random number may not truly be a random number, but a random sequence that follows a "seeded" number. This seeded number is a starting point for the further permutations of random selection, but would have been predictable with a fixed seed value.

2. The Julian date maintained within content server 212 that includes the hours, minutes, seconds, day, date, and four-digit year.

Using this combination, the following code may then be executed:

```
$theDate = 'date'; #get system date
$theDate =~ /(\d+):(\d+):(\d+)\b/i;
$play__list__name = "MoMI__random__playlist__$2$3.m3u";
$random__seed = "$3$2$3"; #use time parts to make random
srand $random__seed; #seed the random num gen.
```

It is appreciated that the time/date provides a basis for seeding the random number generator that is repeatable once per millennium. Now that a random number has been selected, the actual process of applying this to the array of media content titles follows.

Exemplary criteria for selecting a media content title for inclusion in the random play lists may be, but is not limited to, three-fold:

1. There cannot be more than 50 media content titles total in the play list;

2. The selection should come from no more than 20 play lists stored by content server 212; and 3. The selection should not have been previously selected.

Assuming that the first two conditions have not been met, the resulting random number is used as the index into the media content title array and selects the song title that resides in that location in the array. If that title has been previously selected, a new random number is requested, and the process continues until all 3 conditions are fulfilled.

The resulting list of media titles are then formatted into a useable play list (or what may be referred to as a M3U file), and it is written to a memory device of content server 212 while a page is prepared for presenting this information to the user of client computer 204.

The following Perl Script entitled "Random Play List Program" is an exemplary implementation for enabling content server 212 to provide a random play list of media content as described herein.

```perl
#!/usr/bin/perl -w
#-----------------------------------------------------------------------------------

#                    RANDOM PLAY LIST PROGRAM

#  This program reads in a mp3 play list source file in many directories ,
#  displays the random choice of file names ,
#  and creates a new file to download.
#  Programmer: Ted Fitzgerald
#  Created for "themomi.org"
#-----------------------------------------------------------------------------------
my $version;
$version = 5.0;
$ENV {'PATH'} = '/bin:/usr/bin:/usr/local/bin';
# declare variables
my ($i,$j); #just counters
my ($play_list_name); #variable to create random file name for download
my ($how_many_songs); # = total number of songs in all the dirs.
my (@thename); #array to contain the name of the randomly selected song
my (@thepath); #array to contain the URL path of the randomly selected song
my ($showname); #used to find the portion of name we want to display.
my ($song_url);
my (@theheader);
my (@artist);
my ($artist);
my ($theDate);
# ----------------------------- user ajustable paramerters -----------------------------
my $max_num_songs = 34; # set limit of how many songs to display
my $maxdirs = 20; #set limit on number of dirs to look in
my $mp3dir = "../htdocs/mp3"; #path from cgi script to mp3 directory
my $center_col_size = ($max_num_songs /2 + 1);
$|=1; #flush the buffer
use strict;
use CGI qw(:standard);
use CGI::Carp('fatalsToBrowser');
use DBI( );
my $db_host = "AAA.BBB.CCC.DDD";
my $dbh = DBI->connect("DBI:mysql:database=mpb;host=$db_host",
            "PIZZA_MAN", "HE_DELIVERS",
            {'RaiseError' => 1}) or die "can't connect to db";
my $q = new CGI;
print "Content-type: text/html\n\n";
print "<html>";
print "<head>";
print "<title>Random Play List Creation</title>";
print "<style><!--a{text-decoration:none}//--></style>";
print "<style><!--a:hover{color:#3399cc; }--></style>";
print <<HTML_DONE;
<SCRIPT LANGUAGE="JavaScript">
<!--
function changeImages( ) {
   for (var i=0; i<changeImages.arguments.length; i+=2) {
      document[changeImages.arguments[i]].src = changeImages.arguments[i+1];
   }
}
// -->
</SCRIPT>
 <head>
 <body bgcolor="black" topmargin="0" leftmargin="0" marginheight="0" marginwidth="2"
text="white" link="#ffcc66" vlink="#ffcc
66" alink="#ffcc66">
<font size=2 color=white face = arial,san serif, helvetica >
HTML_DONE
$theDate = localtime; #get system date
$theDate =~ /(\d+):(\d+):(\d+)\b/i;
$play_list_name = "Momi_random_playlist_$3$2$3.m3u";
#-----------------------------------------------------------------------------#
# do all file io before displaying the names in list
```

```perl
my $sql = "select pl_header,song_name,song_url,artist from m3u order by rand( ) limit $max_num_songs";
  my $sth = $dbh->prepare($sql);
    $sth->execute( );
  while (my $ref = $sth->fetchrow_hashref( )) {
    my $pl_header = $ref->{'pl_header'};
    my $song_name = $ref->{'song_name'};
    my $song_url = $ref->{'song_url'};
    my $artist = $ref->{'artist'};
    push (@thename,$song_name);
    push (@thepath,$song_url);
    push (@theheader,$pl_header);
    push (@artist,$artist);
  }
open(OUTFILE,">../htdocs/temp/$play_list_name");
#write out file header
print OUTFILE "#EXTM3U\n";
for($i=0;$i<$max_num_songs; $i++){
    print OUTFILE "$theheader[$i]\n";
    $song_url = "$thepath[$i]";
    $song_url =~ s/8080/8081/io;
    print OUTFILE "$song_url\n";
}#end for
close OUTFILE;
#-----------------------------------------------------------------------------#
#now show 'em what they have in the list
print<<MORE;
<center>
MORE
 print "<br>";
 print "</center>";
print "<table align=\"center\" border=0 width = \"95%\">";
print "<tr width=45%><td><td rowspan=$center_col_size align=center valign=top>";
print <<HERE;
<A HREF="http://www.themomi.org/temp/$play_list_name"
        ONMOUSEOVER="changeImages('create_now_vert_01',
'http://www.themomi.org/museum/newimages/create_now_vert_over.gif');
return true;"
        ONMOUSEOUT="changeImages('create_now_vert_01',
'http://www.themomi.org/museum/newimages/create_now_vert.gif'); return
true;">
        <IMG NAME="create_now_vert_01"
SRC="http://www.themomi.org/museum/newimages/create_now_vert.gif" BORDER=0></A>
HERE
print "</td>";
print "<td width=45%></td></tr>";
for($i=0;$i<$max_num_songs;$i++){
   my $flip_flop = ($i % 2 );
   $showname = $thename[$i];
   #$showname =~ /EXTINF:\d+,(.+)/i;
   $showname =~ s/_/ /g;
   $artist = $artist[$i];
   $artist =~ s/_/ /g;
   if($flip_flop){
     print "<td width = 45% align=\"center\"><font size=2 color=white face = arial,san serif,
helvetica >$artist - $showname
</font></td></tr>";
   }else{
     print "<tr><td width=45% align=\"center\"><font size=2 color=white face = arial,san serif,
helvetica >$artist - $showname
</font></td>";
   }
}
   print "</table><br>";
#-----------------------------------------------------------------------------#
# print "<center>";
# print "<br><a href=\"http://www.themomi.org/temp/$play_list_name\">";
# print "<img src=\"http://www.themomi.org/museum/newimages/create_now.gif\"
border=0></a>";
# print "</center>";
  print "<table align=center border=0 width=90%>";
print<<MORE;
<tr><td width=40% align=center> </td>
<td align=center width=10%><font face="Arial,Helvetica,sans-serif" color="gold" size="4">
MORE
print "<A HREF=\"http://www.themomi.org/perl/random_hi.cgi\"";
print<<MORE;
    ONMOUSEOVER="changeImages('rerandom_now_vert_01',
'http://www.themomi.org/museum/newimages/re-randomize_sm_over.gif');
    return true;"
```

```
ONMOUSEOUT="changeImages('rerandom_now_vert_01',
'http://www.themomi.org/museum/newimages/re-randomize_sm.gif');
  return true;">
    <IMG NAME="rerandom_now_vert_01"
SRC="http://www.themomi.org/museum/newimages/re-randomize_sm.gif" BORDER=0></A>
</font></td>
<td> </td>
</tr>
<tr><td width=40% align=center>
<font face="Arial,Helvetica,sans-serif" color="#6699cc" size="3">
<b>Left click<br> (Mac: single click)</b><br> on the center button above to launch
your <br>playlist with your favorite .mp3/.m3u player
</td>
<td align=center width=10%><font face="Arial,Helvetica,sans-serif" color="gold" size="4">--
OR --</font></td>
<td align=center width=40%><font face="Arial,Helvetica,sans-serif" color="#6699cc"
size="3">
<b>Right click<br> (Mac: ctrl + single click)</b><br> on the center button and
use "save target as"<br> to save your playlist file to your computer.</font>
</td></tr>
<tr><td colspan=3 align=center>
MORE
#<font size="2" face="Arial,Helvetica,sans-serif" color="white"><br>
#Note: the music itself will not be saved locally <br> You will only be downloading one small
.m3u file which will
#play the songs from MPB.TV whenever you wish</font><br>
#</td></tr>
print "</table><br><br>";
print "<center>";
 print $q->end_html;
 1;
```

In step 426 of FIG. 4B, upon receiving the requested high fidelity media content from the content server 212, the present embodiment causes client computer 204 to store it. The present embodiment may cause client device 204 to store the received media content in a manner such that it is not easy for the user of client computer 204 to redistribute the media content in an unauthorized manner. For example, the present embodiment may cause the high fidelity media content to be stored by a memory device of client device 204 utilizing one or more hidden directories where it may be cached for a limited amount of time. As part of restricting access to the media content, the present embodiment at step 412 may reject any media player application as invalid if it allows accessibility to the hidden directory. It is noted that if the user of client computer 204 turns it off or quits out of the media player application, the stored media content is typically deleted from the memory of client 204.

At step 428, the user of client computer 204 may cause the media application operating on it to access and utilize the delivered high fidelity media content thereby enabling its user or users to experience (e.g., listen to, view, etc.) the media content. It is noted that a specialized or proprietary media player is not needed in order to utilize the received media content. Instead, an industry standard media player may be utilized by client computer 204 to utilize the received media content. Some of the exemplary industry standard media players that are typically available at no cost and are supported by longstanding organizations may include, but are not limited to, Windows™ Media Player™ for personal computers (PCs), iTunes™ Player or Quicktime™ for Apple computers, and XMMS Player for computers utilizing the Linux operating system.

Accordingly, the present invention provides a method and system for delivering "on-demand" high fidelity music to computer systems via the Internet which does not involve proprietary audio players and/or encryption of the music. Additionally, the present invention provides a method and system that includes the above accomplishment and does not overly congest the communication networks of the Internet. Furthermore, the present invention provides a method and system that includes the above accomplishments and monitors the music (or media) delivered in order to compensate the owner of copyrighted music (or media) for it.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method for providing media content from a source database to a computer while preventing unauthorized access to said source database, said method comprising:

transmitting via a communication network a first request for a media content list from said computer;

transmitting to said computer via said communication network said media content play list together with a unique identification, in response to receiving said first request;

transmitting a second request for delivery of a media content together with said unique identification, in response to receiving said media content list;

transmitting to said computer via said communication network an access key together with an address for said source database containing said media content, in response to said unique identification of said second request being valid;

transmitting a third request together with said access key, in response to receiving said access key together with said address of said source database; and transmitting said media content to said computer, in response to said access key being valid, wherein said address of said media content on said source database is subsequently changed after said transmitting of said media content to said computer.

2. The method as described in claim 1 wherein said communication network comprises the Internet.

3. The method as described in claim 1 wherein said computer is selected from a computer system, a desktop computer, a laptop computer, and a portable computing device.

4. The method as described in claim 1 wherein said access key is a time sensitive access key that becomes obsolete after a defined amount of time.

5. The method as described in claim 1 wherein said media content is selected from an audio clip, a song, a video clip, a picture, a graphics picture, and a multimedia clip.

6. The method as described in claim 1 wherein said media content comprises a digital watermark or an embedded key.

7. The method as described in claim 1 wherein said transmitting a second request for delivery of said media content is performed by an application.

8. The method as described in claim 7 further comprising: determining whether said application is valid.

9. The method as described in claim 8 wherein said application is valid when said application is a media player application.

10. Computer readable storage media having computer readable code embodied therein for causing a system to perform:

transmitting via a communication network a first request for a media content list from a computer;

transmitting to said computer via said communication network said media content list together with a unique identification, in response to receiving said first request;

transmitting a second request for delivery of a media content of said media content list together with said unique identification, in response to receiving said media content list;

transmitting to said computer via said communication network an access key together with an address for said media content, in response to said unique identification of said second request being valid;

transmitting a third request together with said access key, in response to receiving said access key together with said address of said media content;

transmitting said media content to said computer, in response to said access key being valid, wherein said address of said media content on said source database is subsequently changed after said transmitting of said media content to said computer.

11. The computer readable medium as described in claim 10 wherein said communication network is selected from a local area network (LAN), a wide area network (WAN) or the Internet.

12. The computer readable medium as described in claim 11 wherein said computer is selected from a computer system, a desktop computer, a laptop computer, and a portable computing device.

13. The computer readable medium as described in claim 10 wherein said access key is a time sensitive access key that becomes obsolete after a defined amount of time.

14. The computer readable medium as described in claim 10 wherein said media content comprises audio, music, video, a picture, graphics, or multimedia.

15. The computer readable medium as described in claim 14 wherein said media content comprises a digital watermark or an embedded key.

16. The computer readable medium as described in claim 10 wherein said transmitting a second request for delivery of said media content is performed by a software application.

17. The computer readable medium as described in claim 16 further comprising: determining whether said software application is valid.

18. The computer readable medium as described in claim 17 wherein said application is valid when said software application is a media player application.

* * * * *